United States Patent [19]

Lucas et al.

[11] Patent Number: 4,647,545

[45] Date of Patent: Mar. 3, 1987

[54] HALOGENATED GLASSES

[75] Inventors: Jacques Lucas; Marc Matecki, both of Betton; Michel Poulain, Servon; Marcel Poulain, Rennes, all of France

[73] Assignee: Etablissement Public dit: Centre National de la Recherche Scientifique, Paris, France

[21] Appl. No.: 467,375

[22] Filed: Feb. 17, 1983

[30] Foreign Application Priority Data

Feb. 18, 1982 [FR] France ................................ 82 02698

[51] Int. Cl.$^4$ .................................................. C03C 3/12
[52] U.S. Cl. ........................................ 501/30; 501/40; 501/43; 501/904
[58] Field of Search ................... 501/30, 37, 43, 44, 501/40, 904, 56

[56] References Cited

U.S. PATENT DOCUMENTS 2,511,226  6/1950  Sun et al. .............................. 501/44
4,328,318  5/1982  Miranday et al. .................... 501/40

FOREIGN PATENT DOCUMENTS 56-22655  3/1981  Japan ................................... 501/40
1410203  10/1975  United Kingdom .

OTHER PUBLICATIONS

Fonteneau et al, Mat. Res. Bull., vol. 15, pp. 1425–1432, 1143–1147, 1980, USA.

Miranday et al, "Nouveaux Verres Formés Par les Fluorures D'Eléments de Transition", Revue de Chimie Minérale, 16(4), 1979, pp. 277–282.

Matecki et al, "Verres Aux Halogenures de Cadmium", Mat. Res. Bull., 17(10), 1982, pp. 1275–1281.

*Primary Examiner*—Howard S. Williams
*Attorney, Agent, or Firm*—Cushman, Darby & Cushman

[57] ABSTRACT

Halogenated glass comprising 20 to 90 mole percent of at least one of cadmium, manganese and zinc halide and a process for the preparation thereof.

29 Claims, No Drawings

HALOGENATED GLASSES

The present invention relates to new halogenated glasses, to their preparation and to their use.

BACKGROUND OF THE INVENTION

It is known that certain chemical compounds permit the formation of glass, either singly or in combination with other compounds or components. Glasses in which the formative agent is a halide are relatively rare although the vitrifying properties of beryllium fluoride have been known for a long time. Glasses obtained with this compound are, however, costly and toxic. Moreover, the glass formative properties of aluminum fluoride have also been known for a long time.

Recently, glasses based on $ZrF_4$ and $HfF_4$ as well as glasses based on the fluorides of trivalent transition elements such as gallium, iron, chromium, vanadium, iridium or rare earth metals have been described principally in published French patents Nos. 76.18878, 77.09618, 79.07785, 80.06088 and 80.18139.

The capability of a material to form glass, either alone or in combination with other materials, is generally manifested by the fact that the material or a mixture of components, when melted, produce the glass if it is cooled at an accessible known rate. Although present technology permits the use of hypertempering, most of the glass in accordance with the present invention can be produced by casting liquid glass in a narrow mold or by flattening the molten mixture between two metallic elements. Binary glasses require, in general, a very rapid temper. All these glasses of the present invention can also be obtained in vitreous form by evaporation under vacuum and condensation on a substrate, the temperature of which can be modulated depending on the nature of the glass. This latter technique is equivalent to an extremely high liquid cooling rate.

The halogenated glasses of the present invention yield vitrifiable ternary and even binary combinations.

It results from the very nature of the glass that the addition of a third element to a binary system generally does not prevent the formation of glass, but more often favors it by virtue of the classic principle of "confusion" which states that an increase in the number of components leads to a lowering of a tendency to recrystallization. From this fact, the existence of binary glasses implies the existence of numerous ternary glasses by the addition to the former of a component. In the same manner, a ternary glass generates automatically several families of quaternary glasses by the addition of a fourth chemical compound thereto.

The halogenated glasses of the present invention can be prepared at relatively low temperatures.

Their principal interest and use resides in their wide applicability in the field of optical transmission, including the infra-red zone. Except in the particular case of glasses containing colored elements, the glasses of the present invention are transparent ranging from the ultra violet to the infra-red beyond 10 microns and they exhibit several technological advantages over previously known glasses, principally a larger optical opening and a value more lower than the theoretical minimum of losses by absorption, without exhibiting certain disadvantages observed for several families of halogenated glasses.

These properties impart to these glasses interesting characteristics and permit their use principally in the field of infra-red optics.

A particularly interesting use is that involving the production of optic fibers having a length sufficient to transmit infra-red. The uses of glasses transmitting infra-red, principally in the production of devices for the detection and study of thermal objects are well known to experts.

DETAILED DESCRIPTION OF THE INVENTION

The present invention relates then to a novel glass containing as the principal vitrifying element at least one halide of the formula $CdX_2$, $MnX_2$ or $ZnX_2$, X representing a halogen atom and principally an atom of fluorine, chlorine, bromine or iodine.

More precisely, the glasses of the present invention have the following composition:

| Components | Mole Percent |
| --- | --- |
| Cadmium halide | m |
| Manganese halide | p |
| Zinc halide (monohalogenated glass) | $q_1$ |
| Zinc halide (multi halogenated glass) | $q_2$ |
| Alkaline earth or lead halide | r |
| $M_{II}$ metal halide | s |
| Aluminum or magnesium halide | t |
| Rare earth or yttrium halide | u |
| $M_{IV}$ metal halide | v |
| Zr or Hf halide | w |
| $M_{III}$ halide | x |
| $M_I$ halide | y |
| Adjuvants | z | wherein
$0 \leq m \leq 70$, $0 \leq p \leq 70$, $0 \leq q_1 \leq 20$, $0 \leq q_2 \leq 70$, $0 \leq r \leq 80$, $0 \leq s \leq 10$, $0 \leq t \leq 20$, $0 \leq u < 10$, $0 \leq v < 10$, $0 \leq w \leq 30$, $0 \leq x \leq 20$, $0 \leq y \leq 80$, $0 \leq z \leq 20$, $M_I$ being selected from alkali metals, thallium and silver, $M_{II}$ being a divalent metal selected from Cr, Fe, Co, Ni and Cu, $M_{III}$ being a trivalent metal selected from In, Sc, Bi, Fe, Cr, Ga, Ti, V and Sb, $M_{IV}$ being a tetravalent metal selected from Ti, Ce, Sn and the actinides, it being understood that the sum $(m+p+q_1+q_2+r+s+t+u+v+w+x+y+z)$ is equal to 100, that the sum $(m+p+q_1+q_2)$ is greater than or equal to 20 and lower than or equal to 90, and that, when the said glasses contain a rare earth halide (u' content in mole %, with $0 \leq u' < 10$) and/or a $M_{III}F_3$ halide with $M_{III}$ representing In, Fe, Cr, Ga and/or V (x' content in mole %, with $0 \leq x' \leq 20$), the sum (u'+x') is lower than 25 if m is equal to zero.

Representative $M_{IV}$ actinides include, in particular, thorium and uranium.

The rare earth halides mentioned above (u or u' content) are trivalent rare earth derivatives.

The function of the adjuvants which play the role of stabilizers by increasing the disorder of ions is well known. In practice the oxides, hydroxides and the salts of metals other than the halides of metals mentioned above are capable of playing the role of adjuvant.

Representative adjuvants include, principally, the oxides, hydroxides and salts such as carbonates, sulfates, bisulfates, phosphates, arsenates, nitrates, chalcogenides and the like.

Representative glasses of the present invention include:
(1) those for which the sum $(m+p+q_2)$ is greater than or equal to 20 and lower than or equal to 90;
(2) those which contain less than 10 mole percent of adjuvant and those which contain no adjuvant such as defined above;
(3) those for which, m being equal to zero, the sum $(u+x)$ is lower than 25;
(4) those for which the sum $(u+x)$ is lower than 25;
(5) those which contain less than 10 mole percent of $M_{III}$ metal halide, or which contain none of it;
(6) those which are free from rare earth halides;
(7) those for which the sum $(u+x)$ is lower than or equal to 10; and
(8) those which contain at least 40 mole percent, and, in particular, at least 50 mole percent, of cadmium halide, including those which are free from manganese halide and/or zinc halide.

It should be understood that the condition $(m+p+q_2)$ is greater than or equal to 20 is applicable also in the case of monohalide glasses. In other words, in this instance the condition becomes $(m+p)$ greater than or equal to 20 and lower than or equal to 90.

In accordance with one embodiment of the present invention cadmium and manganese behave as vitrifying agents in a fluoride medium. Some binary glasses can be prepared for example in the $CdF_2$—$BaF_2$ system for a cadmium fluoride content between about 55 and 65 percent. Barium can, in this binary, be substituted by lead or another alkaline earth metal such as strontium if one increases the temper speed.

Some ternary glasses are obtained, for example, by combining these binaries with a third fluoride which can be the fluoride of zinc or aluminum, or rare earth or yttrium fluoride, an alkali metal fluoride or again $ThF_4$ or $UF_4$.

More stable compositions, vis-a-vis devitrification, can be prepared starting from more complex combinations including other compounds such as trifluorides or tetrafluorides which increase both the average anion/cation ratio and the degree of partial covalence of the bonds.

As indicated above, the glasses are obtained in the atmosphere by rapid cooling of the melted mixture by contact with cold metal surfaces. The vitreous character is confirmed both by microscopic observation, by the absence of peaks in the diffractograms with X-rays at the wave length K of copper and by the vitreous transition in differential calorimetry.

Certain ones of the compositions can however be stabilized in the glass state only by taking precautions to avoid the presence of oxygen during their preparation, as well as in the starting products as during elaboration. Since the inclusion of oxygen occurs principally by hydrolysis, it is necessary to conduct all the operations of synthesis in a controlled anhydrous atmosphere.

The fluorinated glasses according to the present invention are practically insensitive to atmospheric humidity and can be obtained in a form of sheets which can be as thin as several millimeters in the most stable formulations. Their optical opening can extend generally up to 9 microns or less.

The vitrifying capability of cadmium as manganese is not limited to the fluoride medium, but extends in a general fashion to halogenated chemical systems in which the anionic distribution is constituted by one or more of the following ions: $F^-$, $Cl^-$, $Br^-$ and $I^-$. The monohalogenated glasses, such as the fluorinated glasses, constitute a sub group of the general class of halogenated glasses. They generally exhibit a higher rate of recrystallization and their operation requires a continued prevention of the process of parasitic hydrolysis by residual humidity of the starting products or by atmospheric humidity. Moreover, the presence of bromine or iodine in the composition implies in practice working under controlled atmosphere free from oxygen.

The mixed halogenated glasses, that is to say those including several halogens, exhibit several advantages. In these mixed glasses, the presence of fluorine favors an increased resistance of the material to the environment, in particular, to humidity, and contributes to limiting the index of refraction value. The presence of several halogens tends to decrease the speed of recrystallization.

As an example, the glasses according to the invention have been isolated in the binary systems $CdCl_2$—MF, (M=Na, K, Rb, Cs, Tl, Ag), as well as in a large number of ternary systems such as:
(i) $CdCl_2$—$BaF_2$—$M_1F$, wherein $M_1$ is Na, K, Rb, Cs or Tl,
(ii) $CdCl_2$—$CdF_2$—KX, wherein X is F, Cl, Br or I,
(iii) $CdCl_2$—NaF—KX, wherein X is F, Cl, Br or I,
(iv) $CdCl_2$—$BaF_2$—$ZnF_2$,
(v) $CdBr_2$—$CdF_2$—KX, wherein X is F, Cl, Br or I,
(vi) $CdCl_2$—$BaCl_2$—M″X, wherein X is F, Cl, Br or I and M″ is Na, K, Rb or Cs, and
(vii) $CdBr_2$—KX—KX′ or $CdI_2$—KX—KX′, wherein X′ is a halide different from X.

A few of the corresponding vitreous zones are given in the experimental portion of the present description.

The limits indicated as an example representative of the glasses according to the invention correspond to glasses obtained by tempering a melted mixture at ambient atmosphere. From this fact, the contours of the vitreous zones and hence the compositions which flow from it are capable of being varied in a large measure in accordance with the experimental conditions, the phenomenon of hydrolysis induced by ambient humidity tending generally to inhibit vitrification, but being able exceptionally to favor it. Finally, it is well known that the increase of the tempering speed or rate and the control of various factors influencing nucleation contribute in a very large measure to increase the zone of vitreous formation.

It will also be noted that many of the compositions appear in several systems at the same time; thus the glass $(Cd_{0.4}Ba_{0.1}Na_{0.5})Cl_{0.8}F_{0.7}$ can be obtained starting with ternary ($CdCl_2$, $BaF_2$, NaF) or the quanternaries ($CdF_2$, $CdCl_2$, $BaCl_2$, NaCl), ($CdF_2$, $CdCl_2$, $BaF_2$, NaCl) and ($CdF_2$, $CdCl_2$, $BaCl_2$, NaF).

Each of the aforementioned ternary systems generates quaternary or more complex glasses by the addition of one or more other halides.

The presence of fluorides in the vitreous composition not only increases very significantly the resistance to atmospheric humidity but also affects the infra-red transmission. Thus the glass, $0.3CdF_2$, $0.2CdCl_2$, $0.4BaF_2$, $0.1ZnF_2$ characterized by an index of 1.613, a $T_G$ of 213° C., a $T_C$ of 277° C. and a $T_F$ of 460° C., exhibits a transmission factor of about 60% under 2 mm thickness at a wave length of 11 microns, whereas the glass $0.4CdCl_2$, $0.3CdF_2$, $0.3BaF_2$ with a much lower fluoride content, possesses the same transmission, for the same thickness at 13 microns.

According to another embodiment of the invention, the new halogenated glasses can also be obtained by combining cadmium, manganese and/or zinc with heavy halides such as $Cl^-$, $Br^-$ and $I^-$, to fluorides such as $ZrF_4$, $HfF_4$, $AlF_3$ or the fluorides of trivalent and tetravalent elements which have been cited previously. The total amount of halides (other than fluorides) can range up to 70 mole percent in certain cases, for example with NaCl and the fluorides of zirconium and barium. The introduction of bromides and iodides into the fluorinated glasses is subordinated to the control of the oxido-reduction potential of the bath and the atmosphere at the moment of melting. It is also possible to employ a mixed halide such as BaFCl or PbFCl as the initial reactant, which is equivalent to the mixture of corresponding fluorides and chlorides.

This combination lowers the characteristic temperatures of the glasses and modifies their optical constants, in particular, the index of refraction and the UV and IR transmission openings.

As has been indicated, the preparation of the halogenated glasses must be effected out of contact with humidity. However, the formation of the glass is not totally prevented if a partial hydrolysis is produced at the moment of its elaboration. From this fact, the rules announced above remain valid if the glass contains oxygen or hydroxyl anions in minor amounts, generally less than 5% of the total anions.

In the same manner, the vitreous structure is preserved if there is added, in minor amounts, to any one of the glasses noted above, a mineral salt such as a carbonate, sulfate, nitrate, phosphate, arsenate or oxide. This addition must be limited to 10 molar percent in the general case, but can be higher and go for example up to 20 molar percent, in the case of potassium hydrogen sulfate and phosphates without going outside of the invention.

The glasses according to the invention can be used as optical components for infra-red: openings, lenses, thin plates. They are also useful materials in the form of fibers capable of operating in the infra-red range between 2 and 7 microns with their level of optimum performance, and even beyond up to 11 or 12 microns for short bands or as image transducers. The relative sensitivity to humidity of certain ones of these glasses requires (1) that the surface be protected by a polymeric or mineral coating, especially when the fluoride content is low and (2) that the glass contains polarizing cations.

Representative glasses of the present invention include, principally, those which are constituted only from fluorides; those which are constituted only from chlorides; those which are constituted from fluorides and chlorides; those which are free from fluorides; those which are free from chloride; those which are free from fluoride and chloride; and those which are constituted from a mixture of bromides and iodides.

Additional representative glasses of the present invention includes those which contain in addition to at least one halide of Cd, Zn and/or Mn, from 0 to 60 mole percent of an alkaline earth or lead halide, and from 0 to 80 mole percent of an alkali metal halide, a silver halide or a thallium halide, the eventual remainder being constituted by an adjuvant, it being understood that the alkaline earth or lead halide content and the alkali metal, silver or thallium halide content are not zero simultaneously.

Further, representative glasses of the present invention include those constituted by 20 to 65 mole percent of $CdF_2$ and/or $MnF_2$, 10 to 60 mole percent of $BaF_2$ and 0 to 20 mole percent of $ZnF_2$.

Still other glasses of the present invention are those which contain, in addition to at least one halide of cadmium, zinc and/or manganese, from 5 to 60% of at least one halide of an alkali metal, and from 5 to 60 mole percent of at least one other halide of said alkali metal or of a halide of another alkali metal or of silver or of thallium, the eventual remainder being constituted by an adjuvant.

Yet other glasses of the present invention include those which contain, in addition to at least one halide of cadmium, manganese and/or zinc, from 20 to 80 mole percent of an alkaline earth or lead halide, the eventual remainder being constituted by an adjuvant.

The present invention thus relates principally to the glasses which are described hereafter in the examples of the experimental part of the description.

The process for preparing the novel glasses of this invention comprises principally the steps of mixing the constituents and then melting them. The process is generally operated under a neutral and dry atmosphere when necessary. The liquid glass obtained is then tempered and treated in accordance with conventional methods to give it the desired form. Thus the melted components of the glass can be poured into a mold or spread out with a cylindrical roller, or flattened between two cylindrical rollers turning at a high speed (hypertemper), or even spun into fibers.

It is obvious to the skilled artisan that the starting products can be, in certain instances, oxides (for example $Y_2O_3$ or $ThO_2$) which can be transformed into halides using appropriate agents. A representative fluorinating agent is, for example, ammonium bifluoride ($NH_5F_2$).

Mixtures of halides are heated, preferably, at an elevated temperature ranging from about 50° to 200° C. up to the melting point of the mixture. These melting points, which vary with the composition of said mixtures, are generally between about 250° and 600° C.

Tempering of the glasses of the invention is generally obtained by cooling the same at a rate of about 100° to 800° C. per minute.

The present invention also relates to molded or shaped pieces, or optical fibers, produced from the glasses described above. These optical fibers can be obtained principally using solid preforms in accordance with known techniques.

The present invention also relates to the mixtures of fluorides having the compositions indicated above which are obtained as intermediate products in the preparation process.

The following non-limiting Examples illustrate the invention.

EXAMPLE 1

The following halides, in the form of powders, are mixed together in the amounts indicated below:

| Constituents | Mole percent |
| --- | --- |
| $CdF_2$ | 40 |
| $BaF_2$ | 40 |
| $MnF_2$ | 20 |

The mixture is heated in a platinum tube in a dry atmosphere at a temperature of 750° C. After several minutes at this temperature the resulting melted glass is cooled rapidly by pouring it into a metallic mold at ambient temperature.

The glass obtained is characterized by the following temperatures:
Fusion temperature (Tf)—649° C.
Crystallization temperature (Tc)—350° C.
Vitreous transition temperature (Tg)—285° C.

In an analogous manner, the following glasses have been prepared, the composition and properties of which are set forth in Table I. In this Table the designation of each constituent is preceded by the number which represents the amount of constituent in the glass (in mole percent).

TABLE I

| Ex. | Composition | Tg | Tc | Tf |
|---|---|---|---|---|
| 2 | 50 CdF$_2$ 50 BaF$_2$ | 325 | 380/510 | 625 |
| 3 | 40 CdF$_2$ 40 BaF$_2$ 20 ZnF$_2$ | 283 | 345 | 643 |
| 4 | 42 CdF$_2$ 42 BaF$_2$ 16 AlF$_3$ | 340 | 370.2/423 | 566/691.5 |
| 5 | 48 CdF$_2$ 47 BaF$_2$ 5 YbF$_3$ | 360 | 426/501.5 | 609.2 |
| 6 | 47 CdF$_2$ 47 BaF$_2$ 6 ThF$_4$ | 354 | 406 | 589 |
| 7 | 44.5 CdF$_2$ 44.5 BaF$_2$ 8 AlF$_3$ 3 ThF$_4$ | 375 | 433 | 692 |
| 8 | 45 CdF$_2$ 44.5 BaF$_2$ 8 AlF$_3$ 2.5 YbF$_3$ | 306 | 424.3 | 563.8/686 |
| 9 | 10 CdF$_2$ 50 CdBr$_2$ 40 KCl | 99 | 111 | 309 |
| 10 | 30 CdCl$_2$ 30 CdF$_2$ 40 KCl | 135 | 177 | 364 |
| 11 | 40 CdCl$_2$ 20 CdF$_2$ 40 KI | 104 | 117 | 278 |
| 12 | 5 CdCl$_2$ 62 CdF$_2$ 33 BaCl$_2$ | 182 | 216 | 437 |
| 13 | 30 CdCl$_2$ 20 CdF$_2$ 50 KBr | 114 | 164 | 314 |
| 14 | 40 CdCl$_2$ 10 CdF$_2$ 50 NaF | 123 | 154 | 303 |
| 15 | 50 CdCl$_2$ 10 CdF$_2$ 40 KF | 140 | 164 | 356 |
| 16 | 45 CdCl$_2$ 50 NaF 5 BaF$_2$ | 127 | 142 | 306 |
| 17 | 50 CdCl$_2$ 8 NaF 42 KF | 131 | 156 | 330 |
| 18 | 40 CdCl$_2$ 30 CdF$_2$ 30 BaF$_2$ | 183 | 216 | 451 |
| 19 | 30 CdCl$_2$ 20 CdF$_2$ 10 ZnF$_2$ 40 BaF$_2$ | 213 | 217 | 468 |
| 20 | 50 CdCl$_2$ 10 KCl 40 BaCl$_2$ | 180 | 232 | 363 |

In an analogous manner one has obtained the glasses having the following compositions:

TABLE II

| Ex. | Composition |
|---|---|
| 21 | 40 CdF$_2$ 50 BaF$_2$ 10 ZnF$_2$ |
| 22 | 50 CdF$_2$ 40 BaF$_2$ 10 ZnF$_2$ |
| 23 | 30 CdF$_2$ 30 BaF$_2$ 40 MnF$_2$ |
| 24 | 35 CdF$_2$ 40 BaF$_2$ 25 MnF$_2$ |
| 25 | 50 CdCl$_2$ 40 NaF 10 BaF$_2$ |
| 26 | 20 CdCl$_2$ 40 CdF$_2$ 40 BaF$_2$ |
| 27 | 60 CdCl$_2$ 20 CdF$_2$ 20 BaF$_2$ |
| 28 | 40 CdCl$_2$ 50 NaF 10 KBr |
| 29 | 40 CdCl$_2$ 30 NaF 30 KBr |
| 30 | 50 CdCl$_2$ 40 NaF 10 KBr |
| 31 | 50 CdCl$_2$ 20 NaF 30 KI |
| 32 | 40 CdCl$_2$ 20 NaF 40 KI |
| 33 | 50 CdCl$_2$ 40 NaF 10 KCl |
| 34 | 40 CdCl$_2$ 50 NaF 10 KCl |
| 35 | 70 CdCl$_2$ 10 NaF 20 KF |
| 36 | 45 CdCl$_2$ 25 NaF 30 KF |
| 37 | 40 CdCl$_2$ 20 CdF$_2$ 40 KCl |
| 38 | 30 CdCl$_2$ 20 CdF$_2$ 50 KCl |
| 39 | 60 CdCl$_2$ 30 CdF$_2$ 10 KI |
| 40 | 50 CdCl$_2$ 40 CdF$_2$ 10 KI |
| 41 | 60 CdCl$_2$ 20 CdF$_2$ 20 KBr |
| 42 | 30 CdCl$_2$ 10 CdF$_2$ 60 KBr |
| 43 | 70 CdCl$_2$ 5 CdF$_2$ 25 KF |
| 44 | 40 CdCl$_2$ 10 CdF$_2$ 50 KF |
| 45 | 60 CdCl$_2$ 5 CdF$_2$ 35 NaF |
| 46 | 40 CdCl$_2$ 20 CdF$_2$ 40 NaF |
| 47 | 40 CdF$_2$ 40 BaF$_2$ 20 NaF |
| 48 | 51 CdF$_2$ 40 BaF$_2$ 9 LaF$_3$ |
| 49 | 10 CdF$_2$ 50 CdBr$_2$ 40 KCl |
| 50 | 10 CdF$_2$ 50 CdBr$_2$ 40 NaF |
| 51 | 10 CdF$_2$ 55 CdBr$_2$ 35 KF |
| 52 | 30 CdBr$_2$ 20 NaI 50 KCl |
| 53 | 40 CdBr$_2$ 40 NaF 20 KCl |
| 54 | 50 CdI$_2$ 5 KBr 45 KI |
| 55 | 30 CdBr$_2$ 50 KCl 20 KI |
| 56 | 40 CdBr$_2$ 20 KBr 40 KI |
| 57 | 40 CdBr$_2$ 40 KF 20 KBr |
| 58 | 40 CdI$_2$ 40 KCl 20 KBr |
| 59 | 40 CdCl$_2$ 50 BaCl$_2$ 10 PbCl$_2$ |
| 60 | 46 CdCl$_2$ 34 BaCl$_2$ 20 KCl |
| 61 | 40 CdCl$_2$ 50 BaCl$_2$ 10 NaCl |
| 62 | 10 CdF$_2$ 40 CdBr$_2$ 50 KI |
| 63 | 60 MnF$_2$ 20 CdF$_2$ 20 BaF$_2$ |
| 64 | 40 ZnF$_2$ 10 CdF$_2$ 10 CdCl$_2$ 40 BaF$_2$ |
| 65 | 40 ZnF$_2$ 15 CdF$_2$ 5 CdCl$_2$ 40 BaF$_2$ |
| 66 | 60 ZnF$_2$ 10 CdF$_2$ 10 CdCl$_2$ 20 BaF$_2$ |
| 67 | 60 MnF$_2$ 40 BaF$_2$ |
| 68 | 30 CdF$_2$ 36 BaF$_2$ 34 CdCl$_2$ |
| 69 | 40 CdF$_2$ 30 BaF$_2$ 30 CdCl$_2$ |
| 70 | 28 CdF$_2$ 40 BaF$_2$ 26 CdCl$_2$ 6 MnF$_2$ |
| 71 | 28 CdF$_2$ 36 BaF$_2$ 30 CdCl$_2$ 6 ZnF$_2$ |
| 72 | 65 CdF$_2$ 33 BaCl$_2$ 2 CdCl$_2$ |
| 73 | 50 CdCl$_2$ 30 BaCl$_2$ 20 KCl |
| 74 | 50 CdCl$_2$ 40 BaCl$_2$ 10 NaCl |
| 75 | 65 CdF$_2$ 35 BaCl$_2$ |
| 76 | 56 CdCl$_2$ 44 BaCl$_2$ |

What is claimed is:

1. A halogenated glass consisting of the following tabulated components in the indicated mole percentages:

| Components | Mole Percent |
|---|---|
| Cadmium halide | m |
| Manganese halide | p |
| Zinc halide (monohalide glass) | q$_1$ |
| Alkaline earth or lead halide | r |
| M$_{II}$ metal halide | s |
| Aluminum halide | t |
| Rare earth or yttrium halide | u |
| M$_{IV}$ metal halide | v |
| Zr or Hf halide | w |
| M$_{III}$ metal halide | x |
| M$_I$ metal halide | y and |
| adjuvant | z | wherein
$0 \leq m \leq 90$, $0 \leq p \leq 70$, $0 \leq q_1 \leq 20$, $0 \leq r \leq 80$, $0 \leq s \leq 10$, $0 \leq t \leq 20$, $0 \leq u \leq 10$, $0 \leq v < 10$, $0 \leq w \leq 30$, $0 \leq x \leq 20$, $0 \leq y \leq 80$, $0 \leq z \leq 10$, M$_I$ is an alkali metal, thallium or silver, M$_{II}$ is a divalent metal selected from Cr, Fe, Co, Ni or Cu, M$_{III}$ is a trivalent metal selected from In, Sc, Bi, Fe, Cr, Ga, Ti, V or Sb, M$_{IV}$ is a tetravalent metal selected from Ti, Ce, Sn or an actinide, with the sum (m+p+q$_1$+r+s+t+u+v+w+x+y+z) being equal to 100, and the sum (m+p+q$_1$) being greater than or equal to 20 and lower than or equal to 90, and the sum (u+x) being lower than 25.

2. The halogenated glass of claim 1 wherein said adjuvant is a metallic salt other than the metal halides set forth in claim 1, a metal oxide or a metal hydroxide.

3. The halogenated glass of claim 2 wherein said salt is a carbonate, a sulfate, a bisulfate, a phosphate, an arsenate, a nitrate or a chalcogenide.

4. The halogenated glass of claim 1 that contains from zero to less than 10 mole percent of M$_{III}$ metal halide.

5. The halogenated glass of claim 1 wherein the sum (u+x) is lower than or equal to 10.

6. The halogenated glass of claim 1 which contains at least 40 mole percent cadmium halide.

7. The halogenated glass of claim 6 which contains at least 50 mole percent cadmium halide.

8. The halogenated glass of claim 1 which contains only fluorides.

9. The halogenated glass of claim 1 which contains only chlorides.

10. The halogenated glass of claim 1 which contains only fluorides and chlorides.

11. The halogenated glass of claim 1 which is free of fluoride.

12. The halogenated glass of claim 1 which is free of chloride.

13. The halogenated glass of claim 1 which is free of fluoride and chloride.

14. The halogenated glass of claim 13 comprising a mixture of bromide and iodide.

15. The halogenated glass of claim 1 which contains in addition to at least one of a cadmium halide, a zinc halide and a manganese halide, from 0 to 60 mole percent of an alkaline earth or lead halide and from 0 to 80 mole percent of an alkali metal, silver or thallium halide, the remainder being an adjuvant, with the proviso that the alkaline earth or lead halide and the alkali metal, silver or thallium halide cannot simultaneously be zero.

16. The halogenated glass of claim 1 comprising 20 to 65 mole percent of $CdF_2$ or $MnF_2$, 10 to 60 mole percent of $BaF_2$ and 0 to 20 mole percent of $ZnF_2$.

17. The halogenated glass of claim 1 which contains in addition to at least one of a cadmium, zinc or manganese halide, from 5 to 60 mole percent of at least one alkali metal halide and from 5 to 60 mole percent of at least one other halide of said alkali metal or halide of another alkali metal or silver halide or thallium halide, the remainder being an adjuvant.

18. The halogenated glass of claim 1 which contains in addition to at least one of a cadmium, manganese or zinc halide, from 20 to 80 mole percent of at least one of an alkaline earth or lead halide, the remainder being an adjuvant.

19. A molded or drawn piece or an optical fiber produced from the halogenated glass of claim 1.

20. A process for preparing the halogenated glass of claim 1 comprising mixing the components thereof, melting the resulting mixture and tempering the resulting melt.

21. A halogenated glass consisting of the following tabulated components in the indicated mole percentages:

| Components | Mole Percent |
| --- | --- |
| Cadmium halide | 20–90 |
| Manganese halide | 0–70 |
| Zinc halide | 0–20 |
| Alkaline earth or lead halide | 0–80 |
| Aluminum halide | 0–20 |
| Rare earth halide | 0–10 |
| $M_{IV}$ metal halide | 0–10 |
| $M_I$ metal halide | 0–80 |
| Adjuvant | 0–10 |

22. The halogenated glass of claim 21 wherein the alkaline earth halide is barium halide.

23. The halogenated glass of claim 21 wherein the rare earth halide is lanthanum halide or ytterbium halide.

24. The halogenated glass of claim 21 wherein the $M_{IV}$ metal halide is thorium halide.

25. The halogenated glass of claim 21 wherein the $M_I$ metal halide is sodium or potassium halide.

26. The halogenated glass of claim 21 wherein the adjuvant comprises one or more of $M_{II}$ metal halides and $M_{III}$ metal halides wherein said $M_{II}$ metal is a divalent metal selected from Cr, Fe, Co, Ni or Cu and said $M_{III}$ metal is a trivalent metal selected from In, Sc, Bi, Fe, Cr, Ga, Ti, V or Sb.

27. A halogenated glass the composition of which consists of the below indicated components, each component being present therein in the below indicated mole percent amounts, said halogenated glass being selected from the group consisting of:

(1) 40 mole % $CdF_2$, 40 mole % $BaF_2$ and 20 mole % $MnF_2$, (2) 50 mole % $CdF_2$ and 50 mole % $BaF_2$, (3) 40 mole % $CdF_2$, 40 mole % $BaF_2$ and 20 mole % $ZnF_2$, (4) 42 mole % $CdF_2$, 42 mole % $BaF_2$ and 16 mole % $AlF_3$, (5) 48 mole % $CdF_2$, 47 mole % $BaF_2$ and 5 mole % $YbF_3$, (6) 47 mole % $CdF_2$, 47 mole % $BaF_2$ and 6 mole % $ThF_4$, (7) 44.5 mole % $CdF_2$, 44.5 mole % $BaF_2$, 8 mole % $AlF_3$ and 3 mole % $ThF_4$, (8) 45 mole % $CdF_2$, 44.5 mole % $BaF_2$, 8 mole % $AlF_3$ and 2.5 mole % $YbF_3$, (9) 10 mole % $CdF_2$, 50 mole % CdBr and 40 mole % KCl,

(10) 30 mole % $CdCl_2$, 30 mole % $CdF_2$ and 40 mole % KCl,

(11) 40 mole % $CdCl_2$, 20 mole % $CdF_2$ and 40 mole % KI,

(12) 5 mole % $CdCl_2$, 62 mole % $CdF_2$ and 33 mole % $BaCl_2$,

(13) 30 mole % $CdCl_2$, 20 mole % $CdF_2$ and 50 mole % KBr,

(14) 40 mole % $CdCl_2$, 10 mole % $CdF_2$ and 50 mole % NaF,

(15) 50 mole % $CdCl_2$, 10 mole % $CdF_2$ and 40 mole % KF,

(16) 45 mole % $CdCl_2$, 50 mole % NaF and 5 mole % $BaF_2$,

(17) 50 mole % $CdCl_2$, 8 mole % NaF and 42 mole % KF,

(18) 40 mole % $CdCl_2$, 30 mole % $CdF_2$ and 30 mole % $BaF_2$,

(19) 30 mole % $CdCl_2$, 20 mole % $CdF_2$, 10 mole % $ZnF_2$ and 40 mole % $BaF_2$,

(20) 50 mole % $CdCl_2$, 10 mole % KCl and 40 mole % $BaCl_2$,

(21) 40 mole % $CdF_2$, 50 mole % $BaF_2$ and 10 mole % $ZnF_2$,

(22) 50 mole % $CdF_2$, 40 mole % $BaF_2$ and 10 mole % $ZnF_2$,

(23) 30 mole % $CdF_2$, 30 mole % $BaF_2$ and 40 mole % $MnF_2$,

(24) 35 mole % $CdF_2$, 40 mole % $BaF_2$ and 25 mole % $MnF_2$,

(25) 50 mole % $CdCl_2$, 40 mole % NaF and 10 mole % $BaF_2$,

(26) 20 mole % CdCl$_2$, 40 mole % CdF$_2$ and 40 mole % BaF$_2$,
(27) 60 mole % CdCl$_2$, 20 mole % CdF$_2$ and 20 mole % BaF$_2$,
(28) 40 mole % CdCl$_2$, 50 mole % NaF and 10 mole % KBr,
(29) 40 mole % CdCl$_2$, 30 mole % NaF and 30 mole % KBr,
(30) 50 mole % CdCl$_2$, 40 mole % NaF and 10 mole % KBr,
(31) 50 mole % CdCl$_2$, 20 mole % NaF and 30 mole % KI,
(32) 40 mole % CdCl$_2$, 20 mole % NaF and 40 mole % KI,
(33) 50 mole % CdCl$_2$, 40 mole % NaF and 10 mole % KCl,
(34) 40 mole % CdCl$_2$, 50 mole % NaF and 10 mole % KCl,
(35) 70 mole % CdCl$_2$, 10 mole % NaF and 20 mole % KF,
(36) 45 mole % CdCl$_2$, 25 mole % NaF and 30 mole % KF,
(37) 40 mole % CdCl$_2$, 20 mole % CdF$_2$ and 40 mole % KCl,
(38) 30 mole % CdCl$_2$, 20 mole % CdF$_2$ and 50 mole % KCl,
(39) 60 mole % CdCl$_2$, 30 mole % CdF$_2$ and 10 mole % KI,
(40) 50 mole % CdCl$_2$, 40 mole % CdF$_2$ and 10 mole % KI,
(41) 60 mole % CdCl$_2$, 20 mole % CdF$_2$ and 20 mole % KBr,
(42) 30 mole % CdCl$_2$, 10 mole % CdF$_2$ and 60 mole % KBr,
(43) 70 mole % CdCl$_2$, 5 mole % CdF$_2$ and 25 mole % KF,
(44) 40 mole % CdCl$_2$, 10 mole % CdF$_2$ and 50 mole % KF,
(45) 60 mole % CdCl$_2$, 5 mole % CdF$_2$ and 35 mole % NaF,
(46) 40 mole % CdCl$_2$, 20 mole % CdF$_2$ and 40 mole % NaF,
(47) 40 mole % CdF$_2$, 40 mole % BaF$_2$ and 20 mole % NaF,
(48) 51 mole % CdF$_2$, 40 mole % BaF$_2$ and 9 mole % LaF$_3$,
(49) 10 mole % CdF$_2$, 50 mole % CdBr$_2$ and 40 mole % KCl,
(50) 10 mole % CdF$_2$, 50 mole % CdBr$_2$ and 40 mole % NaF,
(51) 10 mole % CdF$_2$, 55 mole % CdBr$_2$ and 35 mole % KF,
(52) 30 mole % CdBr$_2$, 20 mole % NaI and 50 mole % KCl,
(53) 40 mole % CdBr$_2$, 40 mole % NaF and 20 mole % KCl,
(54) 50 mole % CdI$_2$, 5 mole % KBr and 45 mole % KI,
(55) 30 mole % CdBr$_2$, 50 mole % KCl and 20 mole % KI,
(56) 40 mole % CdBr$_2$, 20 mole % KBr and 40 mole % KI,
(57) 40 mole % CdBr$_2$, 40 mole % KF and 20 mole % KBr,
(58) 40 mole % CdI$_2$, 40 mole % KCl and 20 mole % KBr,
(59) 40 mole % CdCl$_2$, 50 mole % BaCl$_2$ and 10 mole % PbCl$_2$,
(60) 46 mole % CdCl$_2$, 34 mole % BaCl$_2$ and 20 mole % KCl,
(61) 40 mole % CdCl$_2$, 50 mole % BaCl$_2$ and 10 mole % NaCl,
(62) 10 mole % CdF$_2$, 40 mole % CdBr$_2$ and 50 mole % KI,
(63) 60 mole % MnF$_2$, 20 mole CdF$_2$ and 20 mole % BaF$_2$,
(64) 60 mole % MnF$_2$ and 40 mole % BaF$_2$,
(65) 30 mole % CdF$_2$, 36 mole % BaF$_2$ and 34 mole % CdCl$_2$,
(66) 40 mole % CdF$_2$, 30 mole % BaF$_2$ and 30 mole % CdCl$_2$,
(67) 28 mole % CdF$_2$, 40 mole % BaF$_2$, 26 mole % CdCl$_2$ and 6 mole % MnF$_2$,
(68) 28 mole % CdF$_2$, 36 mole % BaF$_2$, 30 mole % CdCl$_2$ and 6 mole % ZnF$_2$,
(69) 65 mole % CdF$_2$, 33 mole % BaCl$_2$ and 2 mole % CdCl$_2$,
(70) 50 mole % CdCl$_2$, 30 mole % BaCl$_2$ and 20 mole % KCl,
(71) 50 mole % CdCl$_2$, 40 mole % BaCl$_2$ and 10 mole % NaCl,
(72) 65 mole % CdF$_2$ and 35 mole % BaCl$_2$, and
(73) 56 mole % CdCl$_2$ and 44 mole % BaCl$_2$.

28. A halogenated glass consisting of the following tabulated components in the indicated mole percentages:

| Components | Mole Percent |
| --- | --- |
| Cadmium halide | m |
| Manganese halide | p |
| Zinc halide (monohalide glass) | $q_1$ |
| Alkaline earth or lead halide | r |
| $M_{II}$ metal halide | s |
| Aluminum halide | t |
| Rare earth or yttrium halide | u |
| $M_{IV}$ metal halide | v |
| Zr or Hf halide | w |
| $M_{III}$ metal halide | x |
| $M_I$ metal halide | y and |
| adjuvant | z | wherein
$0 < m \leq 70$, $0 \leq p \leq 70$, $0 \leq q_1 \leq 20$, $0 \leq r \leq 80$, $0 \leq s \leq 10$, $0 \leq t \leq 20$, $0 \leq u < 10$, $0 \leq v < 10$, $0 \leq w \leq 30$, $0 \leq x \leq 20$, $0 \leq y \leq 80$, $0 \leq z \leq 10$, $M_I$ is an alkali metal, thallium or silver,
$M_{II}$ is a divalent metal selected from Cr, Fe, Co, Ni or Cu,
$M_{III}$ is a trivalent metal selected from In, Sc, Bi, Fe, Cr, Ga, Ti, V or Sb,
$M_{IV}$ is a tetravalent metal selected from Ti, Ce, Sn or an actinide,
with the sum $(m+p+q_1+r+s+t+u+v+w+x+y+z)$ being equal to 100, and
the sum $(m+p+q_1)$ being greater than or equal to 20 and lower than or equal to 90, and the sume $(u+x)$ being lower than 25.

29. A halogenated glass, the composition of which consists of the below indicated components, each component being present therein in the below indicated mole percent amounts, said halogenated glass being selected from the group consisting of:
(1) 40 mole % CdF$_2$, 40 mole % BaF$_2$ and 20 mole % MnF$_2$,
(2) 50 mole % CdF$_2$, 50 mole % BaF$_2$,
(3) 40 mole % CdF$_2$, 40 mole % BaF$_2$ and 20 mole % ZnF$_2$, (4) 42 mole % $CdF_2$, 42 mole % $BaF_2$ and 16 mole % $AlF_3$,
(5) 48 mole % $CdF_2$, 47 mole % $BaF_2$ and 5 mole % $YbF_3$,
(6) 47 mole % $CdF_2$, 47 mole % $BaF_2$ and 6 mole % $ThF_4$,
(7) 44.5 mole % $CdF_2$, 44.5 mole % $BaF_2$, 8 mole % $AlF_3$ and 3 mole % $ThF_4$,
(8) 45 mole % $CdF_2$, 44.5 mole % $BaF_2$, 8 mole % $AlF_3$ and 2.5 mole % $YbF_3$,
(9) 10 mole % $CdF_2$ 50 mole % CdBr and 40 mole % KCl,
(10) 30 mole % $CdCl_2$, 30 mole % $CdF_2$ and 40 mole % KCl,
(11) 40 mole % $CdCl_2$, 20 mole % $CdF_2$ and 40 mole % KI,
(12) 5 mole % $CdCl_2$, 62 mole % $CdF_2$ and 33 mole % $BACl_2$,
(13) 30 mole % $CdCl_2$, 20 mole % $CdF_2$ and 50 mole % KBr,
(14) 40 mole % $CdCl_2$, 10 mole % $CdF_2$ and 50 mole % NaF,
(15) 50 mole % $CdCl_2$, 10 mole % $CdF_2$ and 40 mole % KF,
(16) 45 mole % $CdCl_2$, 50 mole % NaF and 5 mole % $BaF_2$,
(17) 50 mole % $CdCl_2$, 8 mole % NaF and 42 mole % KF,
(18) 40 mole % $CdCl_2$, 30 mole % $CdF_2$ and 30 mole % $BaF_2$,
(19) 30 mole % $CdCl_2$, 20 mole % $CdF_2$, 10 mole % $ZnF_2$ and 40 mole % $BaF_2$,
(20) 50 mole % $CdF_2$, 10 mole % KCl and 40 mole % $BaCl_2$,
(21) 40 mole % $CdF_2$, 50 mole % $BaF_2$ and 10 mole % $ZnF_2$,
(22) 50 mole % $CdF_2$, 40 mole % $BaF_2$ and 10 mole % $ZnF_2$,
(23) 30 mole % $CdF_2$, 30 mole % $BaF_2$ and 40 mole % $MnF_2$,
(24) 35 mole % $CdF_2$, 40 mole % $BaF_2$ and 25 mole % $MnF_2$,
(25) 50 mole % $CdCl_2$, 40 mole % NaF and 10 mole % $BaF_2$,
(26) 20 mole % $CdCl_2$, 40 mole % $CdF_2$ and 40 mole % $BaF_2$,
(27) 60 mole % $CdCl_2$, 20 mole % $CdF_2$ and 20 mole % $BaF_2$,
(28) 40 mole % $CdCl_2$, 50 mole % NaF and 10 mole % KBr,
(29) 40 mole % $CdCl_2$, 30 mole % NaF and 30 mole % KBr,
(30) 50 mole % $CdCl_2$, 40 mole % NaF and 10 mole % KBr,
(31) 50 mole % $CdCl_2$, 20 mole % NaF and 30 mole % KI,
(32) 40 mole % $CdCl_2$, 20 mole % NaF and 40 mole % KI,
(33) 50 mole % $CdCl_2$, 40 mole % NaF and 10 mole % KCl,
(34) 40 mole % $CdCl_2$, 50 mole % NaF and 10 mole % KCl,
(35) 70 mole % $CdCl_2$, 10 mole % NaF and 20 mole % KF,
(36) 45 mole % $CdCl_2$, 25 mole % NaF and 30 mole % KF,
(37) 40 mole % $CdCl_2$, 20 mole % $CdF_2$ and 40 mole % KCl,
(38) 30 mole % $CdCl_2$, 20 mole % $CdF_2$ and 50 mole % KCl,
(39) 60 mole % $CdCl_2$, 30 mole % $CdF_2$ and 10 mole % KI,
(40) 50 mole % $CdCl_2$, 40 mole % $CdF_2$ and 10 mole % KI,
(41) 60 mole % $CdCl_2$, 20 mole % $CdF_2$ and 20 mole % KBr,
(42) 30 mole % $CdCl_2$, 10 mole % $CdF_2$ and 60 mole % KBr,
(43) 70 mole % $CdCl_2$, 5 mole % $CdF_2$ and 25 mole % KF,
(44) 40 mole % $CdCl_2$, 10 mole % $CdF_2$ and 50 mole % KF,
(45) 60 mole % $CdCl_2$, 5 mole % $CdF_2$ and 35 mole % NaF,
(46) 40 mole % $CdCl_2$, 20 mole % $CdF_2$ and 40 mole % NaF,
(47) 40 mole % $CdF_2$, 40 mole % $BaF_2$ and 20 mole % NaF,
(48) 51 mole % $CdF_2$, 40 mole % $BaF_2$ and 9 mole % $LaF_3$,
(49) 10 mole % $CdF_2$, 50 mole % $CdBr_2$ and 40 mole % KCl,
(50) 10 mole % $CdF_2$, 50 mole % $CdBr_2$ and 40 mole % NaF,
(51) 10 mole % $CdF_2$, 55 mole % $CdBr_2$ and 35 mole % KF,
(52) 30 mole % $CdBr_2$, 20 mole % NaI and 50 mole % KCl,
(53) 40 mole % $CdBr_2$, 40 mole % NaF and 20 mole % KCl,
(54) 50 mole % $CdI_2$, 5 mole % KBr and 45 mole % KI,
(55) 30 mole % $CdBr_2$, 50 mole % KCl and 20 mole % KI,
(56) 40 mole % $CdBr_2$, 20 mole % KBr and 40 mole % KI,
(57) 40 mole % $CdBr_2$, 40 mole % KF and 20 mole % KBr,
(58) 40 mole % $CdI_2$, 40 mole % KCl and 20 mole % KBr,
(59) 40 mole % $CdCl_2$, 50 mole % $BaCl_2$ and 10 mole % $PbCl_2$,
(60) 46 mole % $CdCl_2$, 34 mole % $BaCl_2$ and 20 mole % KCl,
(61) 40 mole % $CdCl_2$, 50 mole % $BaCl_2$ and 10 mole % NaCl,
(62) 10 mole % $CdF_2$, 40 mole % $CdBr_2$ and 50 mole % KI,
(63) 60 mole % $MnF_2$, 20 mole % $CdF_2$ and 20 mole % $BaF_2$,
(64) 30 mole % $CdF_2$, 36 mole % $BaF_2$ and 34 mole % $CdCl_2$,
(65) 40 mole % $CdF_2$, 30 mole % $BaF_2$ and 30 mole % $CdCl_2$,
(66) 28 mole % $CdF_2$, 40 mole % $BaF_2$, 26 mole % $CdCl_2$ and 6 mole % $MnF_2$,
(67) 28 mole % $CdF_2$, 36 mole % $BaF_2$, 30 mole % $CdCl_2$ and mole % $ZnF_2$,
(68) 65 mole % $CdF_2$, 33 mole % $BaCl_2$ and 2 mole % $CdCl_2$,
(69) 50 mole % $CdCl_2$, 30 mole % $BaCl_2$ and 20 mole % KCl,
(70) 50 mole % $CdCl_2$, 40 mole % $BaCl_2$ and 10 mole % NaCl,
(71) 65 mole % $CdF_2$ and 35 mole % $BaCl_2$, and
(72) 56 mole % $CdCl_2$ and 44 mole % $BaCl_2$.

* * * * *